Patented Aug. 3, 1937

2,088,642

UNITED STATES PATENT OFFICE 2,088,642

MANUFACTURE OF FILMS, SHEETS, AND THE LIKE

Henry Dreyfus, London, England

No Drawing. Application August 22, 1933, Serial No. 686,313. In Great Britain August 23, 1932

10 Claims. (Cl. 18—57)

This invention relates to improvements in the manufacture of films, sheets, and the like, and is more particularly concerned with the manufacture of sheets, films, foils, and the like, especially foils of the type employed for wrapping purposes, from solutions of cellulose acetate or other cellulose esters or ethers.

In U. S. application S. No. 469,622 filed 21st July, 1930, processes are described for the production inter alia of films and the like, in which solutions of organic derivatives of cellulose are extruded into coagulating media containing relatively high concentrations of solvents for the cellulose derivative in the presence of salts, for example sodium sulphate, sodium chloride, potassium chloride and ammonium nitrate.

I have now discovered that the use of solutions of salts in the absence of high concentrations of solvents for the cellulose derivative yields films and similar products which are very suitable for industrial purposes, particularly for use as wrapping materials. According to the present invention, therefore, solutions containing cellulose acetate or other ester or ether of cellulose are extruded into coagulating media containing salts to form films, foils, sheets, and the like.

The salts employed according to the present invention may be compounds of inorganic acids, as, for example, the nitrates, phosphates and sulphates of sodium, ammonia and potassium, or of organic acids, as for example sodium or potassium acetate, and preferably the compounds have little or no swelling action on the cellulose derivative. Chlorides, e. g. sodium and calcium chloride, are particularly suitable. The salts may be used in any suitable concentration, for example relatively low concentrations such as 5 to 15% or higher concentrations up to the limit of their solubility in the liquid medium employed. In general, however, concentrations of from 20 to 30% are found to yield the best results. The concentration used will depend among other factors upon the solubility of the salt in the liquid medium and upon the rapidity with which it is desired to effect coagulation. Another important factor which may govern the concentration employed is the specific gravity of the coagulating solution obtained. Under certain circumstances, e. g. when the salt solution is a non-solvent or has limited solvent powers for the solvent contained in the spinning solution (compare U. S. application S. No. 684,221, filed August 8, 1933, it may be desirable to adjust the specific gravity of the medium with relation to that of the film-forming solution so that, for example, the products formed have no tendency to displacement due to the difference between the two specific gravities. Thus, when extruding in an upward direction, it may be advantageous to employ a coagulating medium having a specific gravity greater than that of the film-forming solution or of the film itself, since in this manner the motion of the film is assisted by the difference in specific gravities. By varying the concentration of the salt solution and/or by varying the composition of the liquid medium of such solution the relation between these two specific gravities may be adjusted as desired. With a similar object in view the composition of the film-forming solution itself, and particularly of the liquid medium thereof, may also be varied, or any two or more of these means of controlling the specific gravities may be employed.

The coagulating medium used may consist of a salt dissolved in an organic liquid, for example a solution of calcium chloride in alcohol, but preferably aqueous salt solutions are employed, and such solutions may if desired contain proportions of organic liquids miscible therewith, which may be non-solvents or solvents for the cellulose derivative. Thus methyl, ethyl or other alcohols may be employed. If the salt solutions contain solvents for the cellulose derivative, such solvents should be present only in small proportions, relative to the total bulk of the salt solution.

Any suitable concentration of cellulose acetate or other cellulose derivative may be employed in the film-forming solution. Thus relatively low concentrations of about 5–10% may be employed. In general however it is preferable to use higher concentrations, e. g. 12–15% or more, up to 25–27% or even 30%. The solvent employed for making up the solution may be a relatively volatile organic compound as, for example, acetone or mixtures of methylene or ethylene chloride with methyl or ethyl alcohol, or it may be a medium or high boiling liquid, e. g. diacetone alcohol, ethyl lactate, diethyl tartrate, an ester or ether-ester of a glycol or a polyolefine glycol, as for example ethylene glycol monoacetate or methyl glycol monoacetate, dioxane, methylene ethylene dioxide and other cyclic ethers and their homologues and substitution products, as for example ethers and ether-esters of dioxane dicarbinol. Suitable mixtures of solvents, e. g. a low and a higher boiling solvent, may of course be employed if desired. Plasticizers, e. g. tri-cresyl and other tri-aryl phosphates, alkyl phthalates such as diethyl phthalate and aryl sulphonamides, may be present in the solution. The film-forming solution may also if desired contain non-solvents, for example water, hydrocarbons, for example benzene or toluene, or other organic liquids, for example chloroform in the case of acetone-soluble cellulose acetate, or carbon tetrachloride, in any proportions up to that at which incipient precipitation of the cellulose derivative begins.

As is explained above, the composition of the solvent medium of the solution affords one means of controlling the relative specific gravities of such solution and the coagulating medium.

During coagulation a stretch may be imparted to the films or other products, so that very thin products may be produced from relatively large jet orifices, where such a method is used for shaping the solution. For example when the products are received upon a rotating drum or travelling band, the surface of the drum or band may be caused to move at a linear speed greater than that at which the materials are extruded from the shaping orifices, so that they are stretched. Again, an apparatus of the type described in U. S. application S. No. 666,655 filed 18th April, 1933, may be employed to effect a transverse and/or longitudinal stretch.

As is mentioned above, the liquid medium into which the films or similar products are first extruded may be a non-solvent or have limited solvent powers for the solvent of the film-forming solution, and after passing through this medium the products may be carried into another bath which is a good solvent for the solvent of the film-forming solution and in which removal or substantial removal of the remaining solvent takes place. The baths employed may be of totally different constitution or they may consist of a relatively concentrated solution of a salt and a dilute solution thereof, or, if desired, the process may be one in which the concentration of the salt solution continuously decreases so as to bring about a very gradual coagulation of the materials. A convenient method of carrying out this form of the invention consists in the use of a coagulating bath in the form of a long channel, at one end of which the concentrated salt solution is introduced in the neighbourhood of a shaping orifice, water or other diluent being introduced at suitable points along the length of the bath so as to dilute the solution progressively and allow of a gradual coagulation. Suitable outlets may also be positioned along the length of the bath to deal with the additional liquid introduced. Alternatively a succession of baths of gradually decreasing salt concentration may be employed.

Removal or substantial removal of residual solvent from the films or other products may be effected by washing, for example with water or dilute salt solutions or solutions of solvents followed by drying. Preferably, however, residual solvent, or at least the last 5–10% based on the weight of the product, is removed by evaporation, e. g. by passing the materials through drying chambers or over heated surfaces.

Alternatively, removal of the acetone or other solvent employed may be completed in the coagulating bath, in which case washing may, if desired, be omitted.

The films, particularly wide films such as are used for wrapping purposes, may be produced upon any suitable support, for example a band, drum or the like and the film-forming solution may be spread upon the support by means of doctor blades, scrapers or the like, or in any other suitable manner, as by arranging the rear lip of a slit or other delivery device for the solution so that it is adjustable with respect to the band, drum or other support. Alternatively a roller may be employed to spread the solution upon the support, the distance of the roller from such support preferably being adjustable so as to enable different sizes of foils, films or sheets to be produced. If desired such roller may be resilient or be resiliently mounted, or alternatively the support, particularly a drum support, may be resiliently mounted so as to facilitate uniform application of the film-forming solution thereto. The support may be carried into a suitable coagulating bath, either after or during the application of the solution thereto, or the support may be spread with coagulating medium. A very convenient form of apparatus for the purpose of the present invention consists of a revolving drum on which the solution is spread, for example by any of the means described above, the lower portion of the drum dipping into the coagulating bath. Thus, a doctor blade or other spreading device may be arranged at any suitable part on the upper half of the descending part of the drum, the drum then descending directly into the coagulating bath. The portion of the drum to which the film-forming solution is applied may carry coagulant or it may be kept free from such liquid.

Alternatively, the process described in U. S. application S. No. 681,493 filed July 21, 1933, may be employed, in which coagulant is applied to both sides of the sheet, film or other product, for example by passing the product through the bath for a certain distance before it contacts with the band, drum or other support.

As mentioned above, on completion of coagulation, the films or the like may be washed, for example with water or dilute solutions of salts or solvents and may then be dried. Drying of the products may be carried out either upon the drum or other support on which they are produced or on a separate drying apparatus. For example the upper part of the ascending side of the forming drum may be provided with an enclosing heating segment which may be heated with steam pipes or other suitable heating means so that the sheet, film or the like is practically completely dried upon the drum on which it is formed, after which it may be delivered to any suitable take-up rolls. Alternatively, the products may be removed from the forming drum and carried to a separate apparatus, for example an internally heated drum, on which they are dried.

If desired, the process of the present invention may be employed to produce films and the like showing matt, white or coloured effects. Thus by incorporating in the film-forming solution a salt which reacts with the salt contained in the coagulating medium to form an insoluble compound materials containing white or coloured substances may be obtained. For example a solution may contain a salt such as barium chloride or stannic chloride and on extrusion into a coagulating medium containing sodium sulphate or sodium phosphate respectively a white insoluble precipitate will be formed.

The invention is of particular value in the production of foils, films, sheets and the like from acetone-soluble cellulose acetate, but it may be also employed in their production from other cellulose acetates or other cellulose esters or ethers, as for example cellulose nitrate, cellulose formate, propionate, butyrate, nitroacetate or other ester or mixed ester of cellulose, methyl, ethyl, butyl, benzyl or other cellulose ether or mixed ether, and ether-esters of cellulose, as for example ethyl cellulose acetate or oxy-ethyl cellulose acetate.

The following examples are given to illustrate the invention, but are not to be considered as limiting it in any way:—

Example 1

A 25% solution of cellulose acetate containing 2% of water and 73% of acetone is extruded into a coagulating bath consisting of a 20% aqueous solution of calcium chloride through a .005" jet positioned at a distance of about .75" from a rotating roller on which the foil is received. After complete coagulation the foil passes to a washing tank, in which it is washed with water to remove residual calcium chloride and it is then dried and wound.

Example 2

A 15% solution of cellulose acetate in diacetone alcohol is extruded through a jet about .005" wide on to a drum rotating in a saturated solution of sodium chloride. From the drum the coagulated product passes into a bath where it is washed with a dilute sodium chloride solution, for example 5–10%, and it is then dried and wound.

What I claim and desire to secure by Letters Patent is:—

1. Process for the manufacture of foils, films, sheets and the like, which comprises extruding a solution of a cellulose derivative through a shaping device and coagulating the shaped product by the action of a salt solution, the concentration of which gradually decreases from the point where the shaped product enters the solution along the line of travel of the product and is at least 15% at the said point of entry.

2. Process for the manufacture of foils, films, sheets and the like, which comprises extruding a solution of a cellulose derivative in a neutral organic solvent medium through a shaping device and coagulating the shaped product by the action of an aqueous solution of a salt, the concentration of which gradually decreases from the point where the shaped product enters the solution along the line of travel of the product and is at least 15% at the said point of entry.

3. Process for the manufacture of foils, films, sheets and the like, which comprises extruding a solution of cellulose acetate in a neutral organic solvent medium through a shaping device and coagulating the shaped product by the action of an aqueous solution of a salt which has substantially no swelling action on the cellulose acetate, the concentration of the said salt solution gradually decreasing from the point where the shaped product enters the solution along the line of travel of the product and being between 20 and 30% at the said point of entry.

4. Process for the manufacture of foils, films, sheets and the like, which comprises extruding a solution of cellulose acetate in a neutral organic solvent medium through a shaping device and coagulating the shaped product by the action of an aqueous solution of a salt which has substantially no swelling action on the cellulose acetate, the concentration of the said salt solution continuously decreasing from the point where the shaped product enters the solution along the line of travel of the product and being between 20 and 30% at the said point of entry.

5. Process for the manufacture of foils, films, sheets and the like, which comprises extruding a solution of cellulose acetate in a neutral organic solvent medium through a shaping device and coagulating the shaped product by the action of an aqueous solution of a chloride which has substantially no swelling action on the cellulose acetate, the concentration of the said chloride solution gradually decreasing from the point where the shaped product enters the solution along the line of travel of the product and being at least 15% at the said point of entry.

6. Process for the manufacture of foils, films, sheets and the like, which comprises extruding a solution of cellulose acetate in a neutral organic solvent medium through a shaping device and coagulating the shaped product by the action of an aqueous solution of calcium chloride, the concentration of the said calcium chloride solution continuously decreasing from the point where the shaped product enters the solution along the line of travel of the product and being at least 15% at the said point of entry.

7. Process for the manufacture of foils, films, sheets and the like, which comprises extruding a solution of cellulose acetate in a neutral organic solvent medium through a shaping device and coagulating the shaped product by the action of an aqueous solution of sodium chloride, the concentration of the said sodium chloride solution continuously decreasing from the point where the shaped product enters the solution along the line of travel of the product and being at least 15% at the said point of entry.

8. Process for the manufacture of foils, films, sheets and the like, which comprises extruding a solution of cellulose acetate in a neutral organic solvent medium through a shaping device onto a surface adapted to carry it through an aqueous solution of a chloride which has substantially no swelling action on the cellulose acetate, the concentration of the said chloride solution gradually decreasing from the point where the shaped product enters the solution along the line of travel of the product and being at least 15% at the said point of entry, the said surface at the point of application of the extruded solution being maintained substantially free from chloride solution.

9. Process for the manufacture of foils, films, sheets and the like, which comprises extruding a solution of cellulose acetate in a neutral organic solvent medium through a shaping device, coagulating the shaped product by the action of an aqueous solution of a chloride which has substantially no swelling action on the cellulose acetate, the concentration of the said chloride solution gradually decreasing from the point where the shaped product enters the solution along the line of travel of the product and being at least 15% at the said point of entry, and drying the coagulated materials on a heated smooth surface.

10. Process for the manufacture of foils, films, sheets and the like, which comprises extruding a solution of cellulose acetate in a neutral organic solvent medium through a shaping device, coagulating the shaped material in an aqueous solution of a chloride having substantially no swelling action on the cellulose acetate, the concentration of the said chloride solution gradually decreasing from the point where the shaped product enters the solution along the line of travel of the product and being at least 15% at the said point of entry, and subjecting the shaped material to a stretching operation.

HENRY DREYFUS.